United States Patent
Angelo et al.

(10) Patent No.: US 6,170,992 B1
(45) Date of Patent: Jan. 9, 2001

(54) SEALING DEVICE FOR A ROLLING CONTACT BEARING

(75) Inventors: Vignotto Angelo, Turin; Maldera Carlo, Giaveno, both of (IT)

(73) Assignee: SKF Industrie S.p.A., Turin (IT)

( * ) Notice: Under 35 U.S.C. 154(b), the term of this patent shall be extended for 0 days.

(21) Appl. No.: 09/263,652

(22) Filed: Mar. 5, 1999

(51) Int. Cl.[7] ............................... F16C 33/76; F16J 15/32
(52) U.S. Cl. ..................... 384/477; 384/484; 384/486; 277/551
(58) Field of Search ................................. 384/477, 480, 384/481, 482, 484, 486; 277/551, 572, 576

(56) References Cited

U.S. PATENT DOCUMENTS

| | | |
|---|---|---|
| 4,708,497 | 11/1987 | Lederman . |
| 4,848,776 | * 7/1989 | Winckler ........................ 384/486 X |
| 5,096,207 | * 3/1992 | Seeh et al. ...................... 384/486 X |
| 5,215,387 | 6/1993 | Bertetti et al. . |
| 5,269,536 | * 12/1993 | Matsushima et al. ........... 277/551 X |

FOREIGN PATENT DOCUMENTS

| | | |
|---|---|---|
| 70 34 015 | 9/1970 | (DE) . |
| 43 38 261 | 5/1994 | (DE) . |
| 0 156 552 | 10/1985 | (EP) . |
| 2 207 470 | 2/1989 | (GB) . |
| 94A000596 | 7/1994 | (IT) . |

* cited by examiner

Primary Examiner—Richard M. Lorence
(74) Attorney, Agent, or Firm—Merchant & Gould P.C.

(57) ABSTRACT

A rolling contact bearing has a rotating unit to be integrally assembled to a rotating race (11) of the bearing, comprised of a first metallic annular insert (19) which forms a substantially disc-shaped radial wall (22) and a non-rotating unit to be integrally assembled to the non-rotating race (10) of the bearing, comprised of a second metallic annular insert (15) which has a sealing covering (14) with at least one sealing lip (18) suitable for sliding against the axially inner side of the disc-shaped wall (22); the rotating unit forms at least one substantially radial rotating surface (25) of a given minimum diameter ($D_R$) and the non-rotating unit forms at least one substantially radial non-rotating surface (25) with a maximum diameter ($D_S$) lesser than the minimum diameter, where the units are reciprocally positioned in such a way that the rotating surface (25) is facing the non-rotating surface (23a) from an inner axial position to form an axial stop for the non-rotating surface (23a), so as to provisionally restrain the two coupled surfaces in relation to each other in order to assemble the sealing device on the bearing in a correct arrangement.

9 Claims, 5 Drawing Sheets

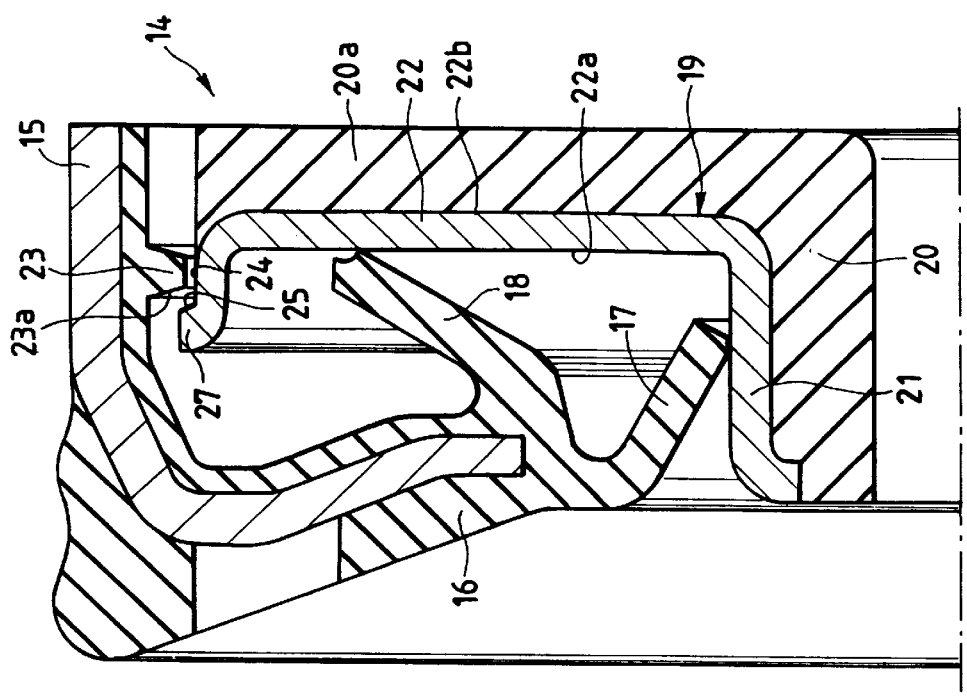
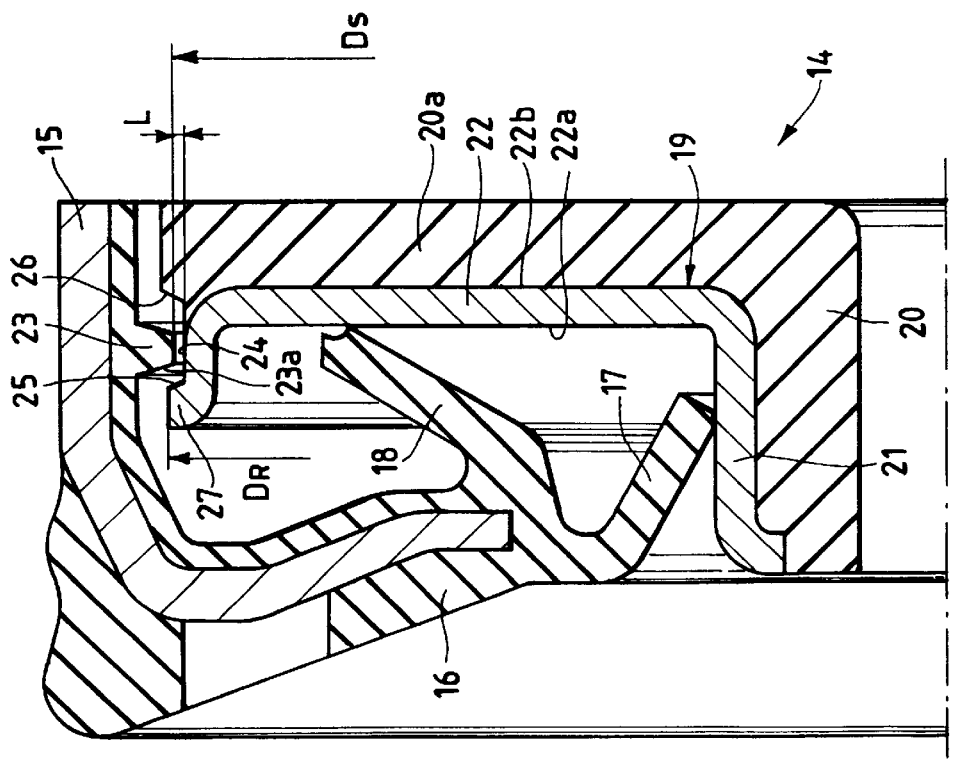

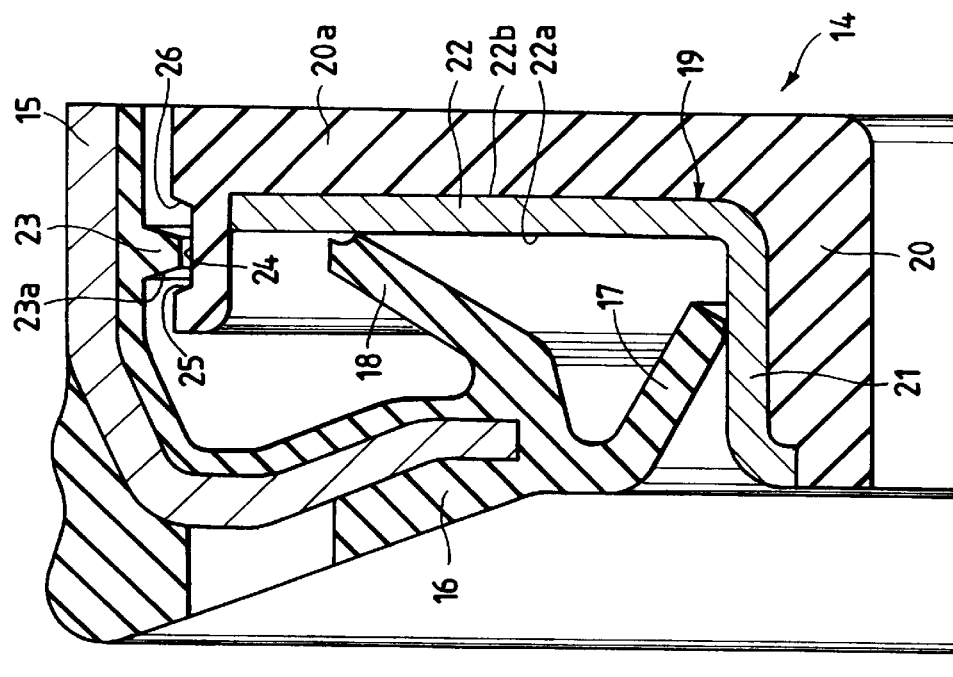
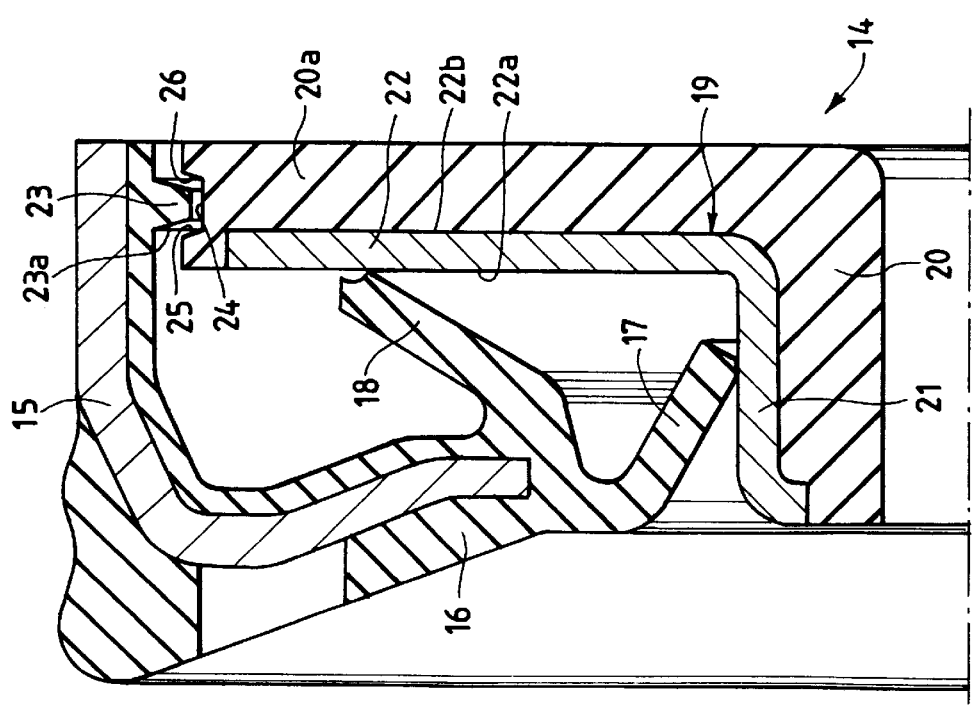

SEALING DEVICE FOR A ROLLING CONTACT BEARING

TECHNICAL FIELD

The present invention refers to a sealing device for a rolling contact bearing.

BACKGROUND

In the rolling bearing contact industry there is currently a tendency to integrate sealing devices between the non-rotating race and the rotating race of the bearing with a magnetised encoder wheel which forms part of a device for measuring the relative rotation speed between the bearing races.

The accompanying drawings 1 and 2 show an example of such a well-known technique. A rolling contact bearing, comprised of a non-rotating outer race 10, a rotating inner race 11 and two series of rotating elements 12, in this case spheres, is provided with a pair of sealing devices, indicated overall with the number 14, arranged on both sides of the bearing to hermetically close the space between the races 10 and 11. A metallic annular insert 15, firmly force fitted onto the non-rotating outer race 10, bears an annular sealing covering 16 which forms a pair of lips 17, 18, which slide against a metallic annular insert 19 onto which is vulcanised an annular rubber element 20; the rubberised insert 19 is then forcefully fitted onto the inner rotating race 11 of the bearing. The rotating insert 19 has a substantially L-shaped axial section, in which there is a cylindrical wall 21, which the lip 17 (defined here as radial) slides against and a radial wall in the form of a disc 22, which the lip 18 (defined here as axial) slides against.

The part 20a of the rubber element 20 which covers the axially outer side 22b of the disc-shaped wall 22 is charged with metallic particles to form an encoder wheel which, when it rotates, generates impulses of a frequency proportional to the rotation speed of the rotating race 11 in a fixed sensor facing said encoder wheel, which is not illustrated here for the sake of simplicity.

In order to assemble the two inserts 15, 19 with their respective rubber units 16, 20 onto the bearing in a single driving operation in which these two coupled units are forcefully thrust in an axial direction, it is indispensable that the two inserts with their relative rubber elements are reciprocally positioned in the correct fashion, according to the arrangement illustrated in FIG. 2.

Given the particular arrangement of the sealing lips of the watertight shield, the coupling between the two units derives solely from the radial thrust which the radial lip 17 exerts against the wall 21, while the axial thrust exerted by axial lip 18 against the axially inner surface 22a of the wall 22 tends to separate the two units.

It is not easy to obtain this state in practice, due to other factors which tend to separate the two units, such as for example shock or impact sustained during transport.

In case one or both of the sealing covering lips should slip from their operating position which is set during the pre-assembly step, there is a risk that the sealing device of the bearing could be assembled in an incorrect arrangement in which the lips 17, 18 do not come into contact with the respective walls 21, 22. This results in the malfunction of the sealing device and thus shortens the working life of the bearing due to insufficient sealing action.

SUMMARY

An aim of the present invention is to suggest a reliable solution which always ensures that the units forming the sealing device are positioned correctly, in particular the lips of the sealing covering.

Another aim of the present invention is to realise a device that will make assembling the sealing device onto the bearing easier and faster.

These and other aims and advantages, that will be better understood hereinafter, are achieved according to the present invention by a device with the characteristics described according to claim 1. Other important characteristics of the present invention are described in the dependent claims.

BRIEF DESCRIPTION OF THE DRAWINGS

There will now be described the structural and functional characteristics of some preferred but not limiting embodiments of the device according to the invention; reference being made to the accompanying drawings, in which:

FIG. 3 is an axial sectional view of a sealing device according to the present invention, in a relevant first preferred embodiment; and FIGS. 4 to 9 are axial sectional views, similar to that shown in FIG. 3, of relevant alternative forms of the invention.

DETAILED DESCRIPTION OF THE PREFERRED EMBODIMENTS

Figure 1:
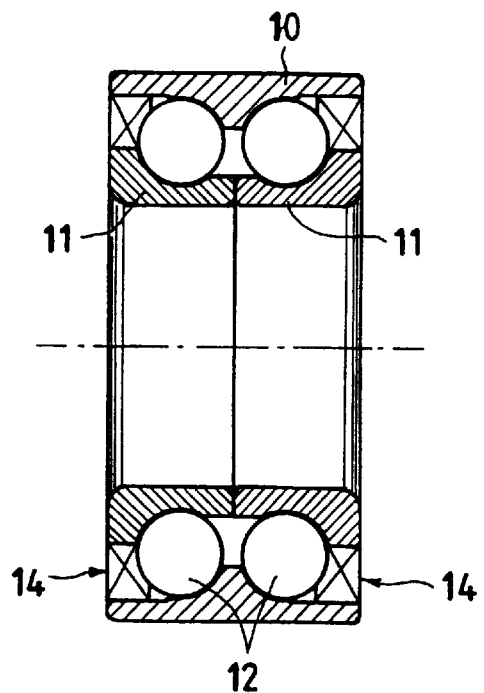
FIG. 1 is an axial sectional view of a bearing provided with a sealing device of a well-known type.

With reference to FIG. 3, and using the same reference numbers as those used in the introductory part of the description to denote the same or similar parts, the aim is to couple the non-rotating unit of the sealing device, comprised of the radially outer insert 15 and the sealing covering 16, with the rotating unit, comprised of the insert 19 with the rubber element 20. The two units, rotating and non-rotating, are coupled by hooking, as will be described more clearly below, so that the sealing device is put into a relatively stable pre-assembly arrangement in which the lips of the sealing covering are correctly positioned against the surfaces against which they must respectively slide when in an operating position, so that the device can be mounted with a single, simple axial thrust into the annular space which exists between the races of the bearing on one or both of its sides.

To achieve this aim, the rubber which constitutes the covering 16 has a circumferential relief 23 which extends in a radially inner direction into a circumferential groove 24 obtained in the rotating unit. The relief 23 is thus axially interposed between two substantially radial surfaces 24, 25 integral to the rotating unit; these surfaces comprise axial stopping means which restrain the raised unit between them during transport and assembly and thus maintain the two units in a reciprocally correct position.

More particularly, still with reference to FIG. 3, the diameter $D_R$ of the rotating unit corresponding to the axially inner stopping surface 25 is greater than the diameter $D_S$ of the non-rotating or stationary unit, so that when the two units are coupled before the sealing device is assembled onto the bearing, the axial thrust exerted by the lip 18 (shown as going to the right in FIG. 3) is bucked by the abutting of the axially inner radial surface of the relief 23 and the stopping surface 25, so that the two units are restrained in a reciprocally correct position during the transitory steps of transport and manipulation. When the device is then inserted between the races of the bearing, by the driving operation, the two units are axially positioned in such a way that the relief 23 and the surfaces of the groove 24 do not come into contact with each other.

In the example illustrated in FIG. 3, the axially inner radial surface 25 defined by a peripheral extension 27 of the inner insert 19, while the axially outer surface is defined by the peripheral part of the rubber element 20 which covers the outer side of the insert 19.

Figure 2:
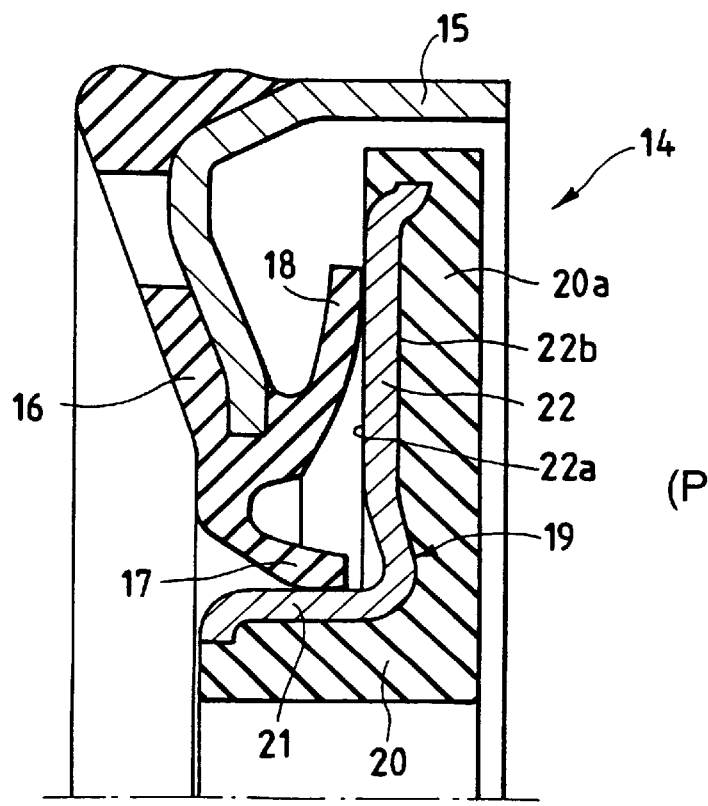
FIG. 2 is a view, on an enlarged scale, of the traditional type of sealing device shown in FIG. 1.

It is preferable that the relief 23 does not come into contact with the surfaces 25 and 26, nor the bottom surface of the groove 24, but that it should extend in proximity to at least one of these surfaces to implement with these a labyrinth which improves the sealing action in comparison with traditional sealing methods, such as for example the kind illustrated in FIG. 2. As is obvious from a comparison of FIGS. 2 and 3, the radial light L which exists between the rotating unit and the non-rotating unit is considerably reduced in the case of the device according to the present invention.

FIG. 4 illustrates a second modified form of the device according to the present invention, in which the rotating unit shows only the axially inner radial stopping surface 25 formed by the peripheral extension 27 of the insert 19.

FIGS. 5 and 6 show two other variations according to which the circumferential groove 24 is derived from the peripheral part of the rubber covering 20.

Figure 7:
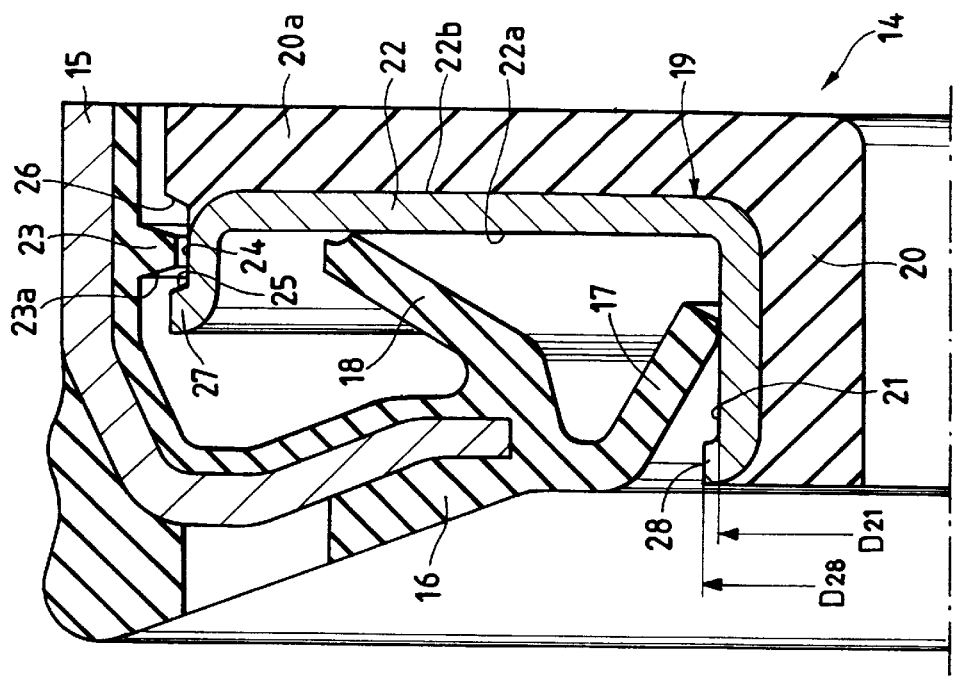
Figure 8:
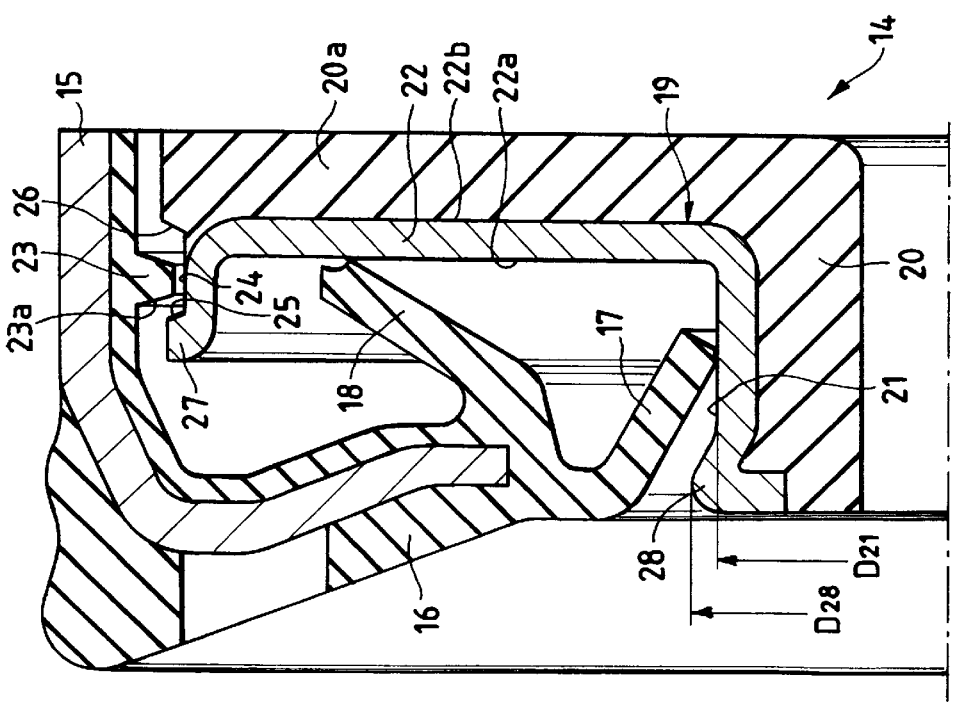
Figure 9:
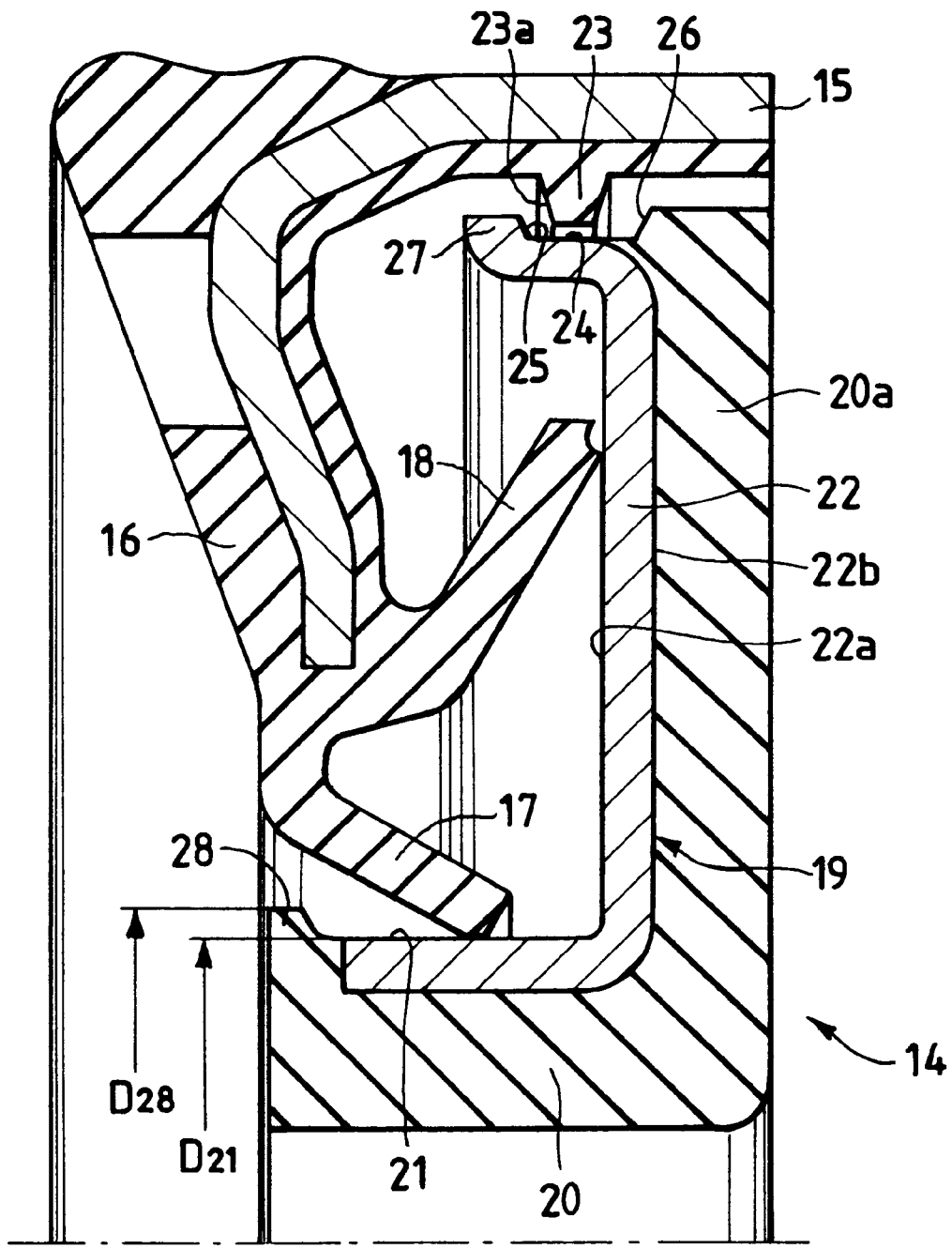

FIGS. 7, 8 and 9 show three further variations of the sealing device according to the present invention. In these forms of the embodiment, the rotating unit forms an additional circumferential relief 28 situated in proximity to the axially inner end of the cylindrical 21 of the shield 19; the relief 28 extends in a radially outer direction in comparison with the cylindrical wall 21 to defines a stopping surface for the radial lip 17. In the examples shown in FIGS. 7 and 8 the relief 28 is created from the inner end of the cylindrical wall 21, while in the example in FIG. 9 the relief 28 is created from the inner end of the rubber element 20; in any case the diameter D28 of the relief 28 is greater than the diameter D21 of the cylindrical wall 21.

It is intended that the invention not be limited to the forms of embodiment herein described and illustrated, which should be considered as examples of how the sealing device can be put to use, it may be subject to various modifications in terms of the shape and disposition of the parts, constructive details and functions. For example, the radial relief 23 and 28 could be extended around the entire circumference of the device, or reduced to the form of radial teeth distributed around the circumference of the rotating unit. Finally, the inventive step could be applied to any kind of sealing device with or without an integral encoder wheel of the kind illustrated in the examples discussed above.

What is claimed is:

1. Sealing device for a rolling contact bearing, said device being comprised of:
   a rotating unit to be assembled fixedly connected with a rotating race of the bearing, comprised of a first annular metallic insert, which is comprised of a radial wall substantially disc-shaped and of a cylindrical wall portion; and
   a non-rotating unit to be assembled fixedly connected with a non-rotating race of the bearing, comprised of a second annular metallic insert which has a covering scaling with a first sealing lip suitable for sliding against the axially inner side of said disc-shaped wall, and a second second lip which extends in a radially inner direction to slide against said cylindrical wall;
   wherein said rotating unit comprises at least one substantially radial rotating surface with a given minimum diameter and that said non-rotating unit comprises at least one substantially radial non-rotating surface with a maximum diameter which is lesser than said minimum diameter, and is formed by at least one circumferential relief extending in an inner radial direction and made of rubber, where said units are reciprocally positioned in such a way that said rotating surface faces said non-rotating surface from an axially inner position to comprise an axial stopping means for the non-rotating surface, so as to provisionally restrain the two coupled units in relation to each other in order to assemble the sealing device onto the bearing in a correct arrangement.

2. A scaling unit according to claim 1, wherein said circumferential relief extends into a circumferential groove obtained in the rotating unit, so that the relief is axially interposed between two substantially radial surfaces which form said groove.

3. A sealing device according to claim 2, wherein said rubber relief is a one-piece construction with said covering sealing.

4. A sealing device according to claim 1, wherein said rotating surface is formed by a peripheral edge of said disc-shaped wall.

5. A scaling device according to claim 1, wherein said rotating surface is defined by a peripheral edge covered by a rubber or elastomer magnetized unit which covers at least partially the axially outer side of said disc-shaped wall to realize an encoder wheel.

6. A sealing device according to claim 1, wherein said non-rotating surface extends in the proximity of at least one surface of the rotating unit in order to form with these a labyrinth seal.

7. A sealing device according to claim 1, wherein the rotating unit comprises an additional circumferential relief situated in the proximity of the inner axial end of said cylindrical wall portion, where said additional relief extends in a radially outer direction compared to the cylindrical wall to define a stopping surface for said second lip.

8. A scaling device according to claim 1, wherein said surfaces are continuous around the circumferential development of the device.

9. A sealing device according to claim 1, wherein said surfaces are discrete around the circumferential development of the device.

* * * * *